Figure 1:
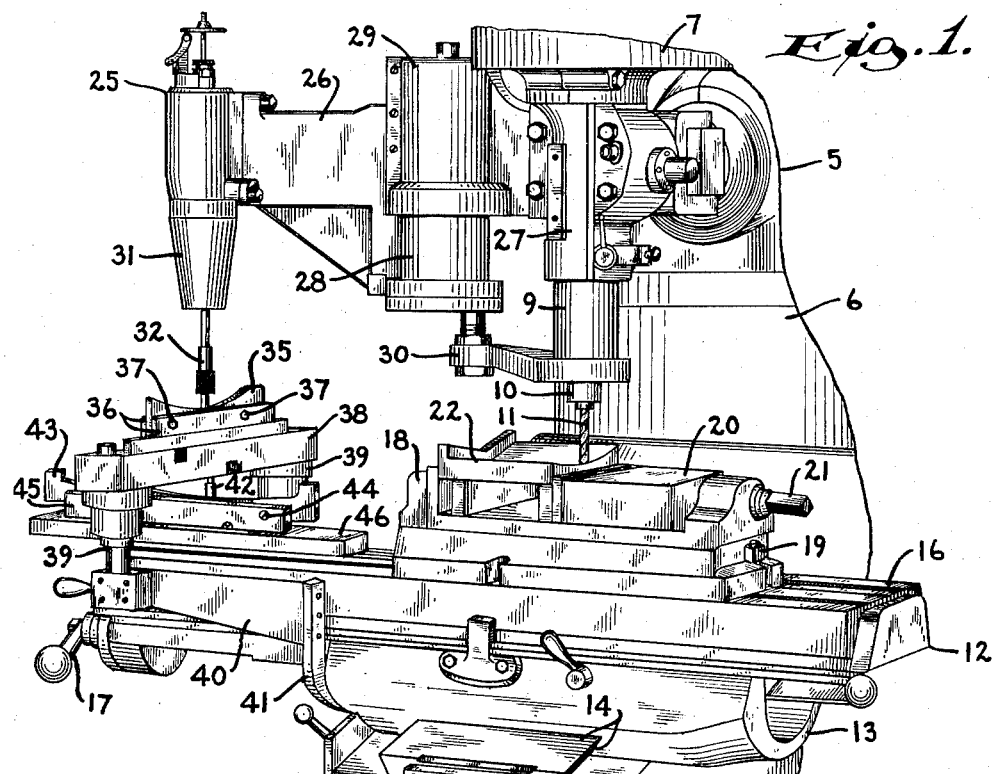

Patented Apr. 17, 1951

2,549,024

UNITED STATES PATENT OFFICE 2,549,024

CUTTER GUIDE ATTACHMENT FOR FORMING MACHINES

Leonard J. Siepe, Milwaukee, Wis.

Application March 18, 1949, Serial No. 82,147

6 Claims. (Cl. 90—13.5)

The present invention relates generally to improvements in cutting or forming machines, and relates more particularly to improvements in the construction and operation of cutter guide attachments for vertical type milling machines, or like forming machines embodying a vertical and longitudinal feed and a movable cutter.

A primary object of this invention is to provide a cutter guide attachment for milling machines or the like which is simple and compact in construction and which is moreover highly efficient and accurate in operation.

In milling and other machines of the type embodying a cutter rotatable about a vertical axis and adapted to perform successive cutting operations on a piece of work positioned therebelow upon movement of the work both longitudinally and transversely relative to the cutter, it has heretofore been common practice to provide a hydraulic or manual follower attached to the head of the cutter and having a guide-style adapted for coaction with the surface of a complete pattern for guiding the cutter in its operation and depth of cut. Since it is usually necessary to make several transverse cuts of varying depths at different points along the work to obtain the desired pattern contour, it has heretofore been deemed necessary in such instances to use a complete pattern for the guide; and these patterns must be carefully and accurately formed and machined by time-consuming hand operations of trained mechanics at high cost.

It is, therefore, a more specific object of my present invention to provide improved guide means for coaction with the follower attachment of a forming machine which obviates the disadvantages attendant prior devices and which eliminates the necessity of providing a complete pattern for cutter guiding purposes.

Another specific object of my invention is to provide an improved cutter guide attachment for vertical milling machines wherein forming or guiding templates or bars may be utilized for both transverse and longitudinal contour.

Another specific object of the invention is to provide improved instrumentalities for guiding the cutter of a vertical milling machine without the need for pre-forming a complete pattern for the work and which may be readily attached to, or detached from, the machine in a quick and easy manner, with the aid of standard tools.

An additional specific object of this invention is to provide an improved double-forming cutter guide attachment for forming machines which is exceedingly durable in construction and highly efficient and accurate in operation, and which may be utilized in conjunction with either a hydraulic or a manual pattern follower of any standard make.

A further object of the present invention is to provide an improved cutter guide attachment for machines such as vertical milling machines provided with a pattern follower, which comprises, a template adapted for coaction with the guide-style of the follower to guide the same during transverse movement of the cutter, a support for the template mounted on the transversely movable work-supporting table of the machine, a guide-style carried by the template support, and a second template adapted for coaction with the last-mentioned guide-style to guide the same during longitudinal movement of the cutter, the second template being mounted on the longitudinally movable portion of the work-supporting table of the machine.

Still another specific object of the present invention is to provide an improved cutter guide attachment for forming machines wherein simple and relatively inexpensive templates of a variety of different shapes and sizes may be interchangeably utilized to effect the desired resultant contour on the work.

These and other specific objects and advantages of the improvement will be apparent from the following detailed description.

A clear conception of the several features constituting my present invention, and of the mode of constructing and of utilizing cutter guide attachments embodying the improvements, may be had by referring to the drawing accompanying and forming a part of this specification, wherein like reference characters designate the same or similar parts in the various views.

Figure 2:
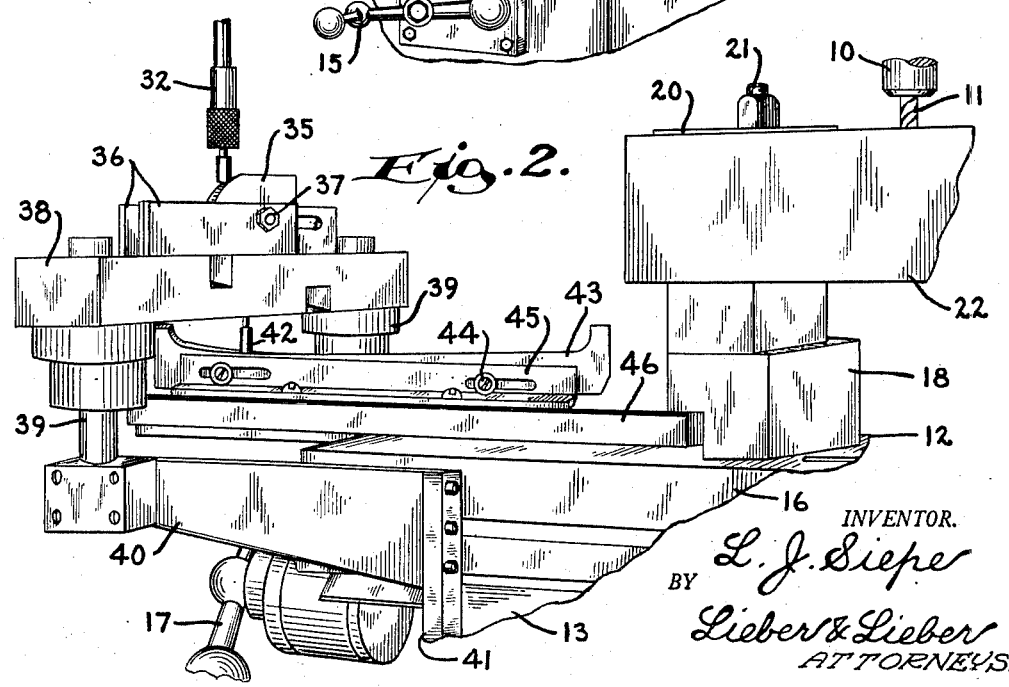

Fig. 1 is a perspective view of a fragment of a milling machine with one of the improved cutter guide attachments applied thereto; and Fig. 2 is a somewhat enlarged similar perspective fragmentary view of the cutter guide portion of the assemblage with a somewhat different form of upper template.

While the invention has been shown as being advantageously applicable to a vertical milling machine having a particular type of hydraulic pattern follower associated therewith and with templates of specific configurations for forming a certain desired pattern cooperating with the follower, it is not my desire or intent to thereby unnecessarily restrict the scope or utility of the improved features; and it is also contemplated that specific descriptive terms employed herein be given the broadest possible interpretation consistent with the disclosure.

Referring to the drawing, the improved guide attachment is illustrated in conjunction with a vertical milling machine 5 of conventional known construction and comprising generally, a main frame or housing 6 having driving means such as an electric motor, not shown, housed within the upper portion 7 and having a fixed base 8 spaced from the motor housing 7; a vertically movable cylindrical carrier piston or slide 9 associated with the driving motor and having a vertical spindle 10 rotatably journalled therein and depending therefrom and adapted to be driven by the motor in a known manner, the spindle 10 having a cutter or other machine tool 11 attached thereto; and a work support or table 12 consisting of a lower section or first support 13 mounted, as by means of a dovetail connection 14, for reciprocation in one direction in a horizontal plane relative to the fixed base or bed 8 upon rotation of the crank 15, and an upper section or second support 16 carried by the section 13 and reciprocable in another direction in a horizontal plane relative to both the table section 13 and the base 8 upon rotation of the crank 17 in an obvious manner, the upper section 16 being adapted to receive and support a fixture 18 adjustably secured thereto as by means of bolts 19 and having a clamping block 20 and a cap screw or bolt 21 associated therewith to clamp the work piece 22 within the fixture below the cutter 11.

As in the case of the milling machine 5, the hydraulic pattern follower 25 is also of conventional or standard design and comprises, in general, a laterally projecting bracket 26 mounted by means of a suitable clamp 27 to the stationary cutter driving head; a piston or plunger 28 vertically reciprocable in a hydraulic cylinder 29 and having the lower depending end thereof secured to the cutter carrying slide 9 by means of a suitable guide or arm 30; and a vertically movable slide 31 carried by the bracket 26 and also connected to the piston 28 in a well-known manner for movement therewith, the follower slide 31 being provided with a guide-style or contour following finger 32 depending from the lower end thereof and adapted to coact with a contour form carried by the support 12 to guide the cutter 11 in its operation in an obvious manner, it being customary past practice for this purpose to provide an entire pattern form mounted upon the upper section 16 of the work support immediately below the guide-style 32 for coaction therewith.

The improved guide attachment forming the subject matter of the present invention comprises, an upper elongated template or first dimension contour 35 detachably and adjustably secured by means of bolts 37 or the like between a pair of clamping member 36 mounted on a supporting member or block 38 carried for vertical movement with respect to the supporting section 13 by a pair of end posts 39 associated with the ends of the laterally extending arms 40 of a rigid bracket 41 mounted on the lower section 13 of the work support or table 12 in a convenient manner for movement with the section or support 13, the template 35 having the upper edge thereof shaped to the desired transverse contour of the work 22 and extending transversely of the work for coaction with the guide-style or finger 32 of the follower 25 during horizontal movement of the section 13 of the work support to trace one dimension; auxiliary guide means, such as a guide-style or second contour follower 42, carried by the template supporting block 38 and depending therefrom, the stylus 42 being secured to the block 38 in any suitable manner as by a set screw, screw threads, gun lock or the like; and a lower elongated template or second dimension contour 43 detachably and adjustably secured by means of bolts 44 or the like between a pair of clamping bars or members 45 associated with a second supporting member or block 46 adapted to be secured to the upper section 16 of the work support 12 in any desired position of adjustment therealong for movement therewith, the template second dimension contour 43 having the upper edge thereof shaped to the desired longitudinal contour of the work 22 and extending longitudinally thereof for coaction with the guide-style or second contour follower 42 of the template block 38 during horizontal movement of the section 16 of the work support.

In operation, the work piece 22 is clamped to the fixture 18 in an obvious manner and the work-holding fixture is then secured in position on the upper slide or section 16 of the table 12 below the cutter 11 by means of the bolts 19. A template 43 of the desired longitudinal contour may then be clamped to the block 46 which is likewise secured to the section 16 of the support 12 a fixed distance from the work 22 as determined by the distance between the cutter 11 and guide-style 32. Thereafter, the template 35 of the desired transverse contour may be clamped in position on the block or supporting member 38 which, in turn, is mounted for vertical movement by means of the posts 39 which have their lower portions freely vertically movable in the ends of the respective arms 40 of the bracket 41 which is secured to the lower slide or section 13 of the support 12 thereby rendering the member 38 freely movable under gravity and/or pressure until stopped by the guide-style or follower 42, the guide-style 32 of the follower 25 being constantly in vertical alinement with the template 35 to trace one dimension and the guide-style 42 of the block 38 being constantly in vertical alinement with the template 43 to trace a dimension transversely to the first dimension and to transmit vertical movement to the template 35.

With the various parts thus positioned, the section 16 of the work support is moved, by means of the crank 17, so that the cutter 11 coincides with one end edge of the work piece 22 and the lower section 13 of the work support is moved, by means of the crank 15, so that the cutter also coincides with the inner side edge of the work 22. The hydraulic pattern follower 25 may then be actuated in a well-known manner to cause the cutter 11 and guide-style 32 to assume corresponding starting positions with the cutter being urged toward the work 22, the guide-style 32 being urged toward the upper edge of the template 35 and the guide-style 42 being urged toward the upper edge of the template 43. As the cutter 11 is rotated by the driving source in a known manner, the section 13 of the work support is caused to move slowly, either manually or automatically, with respect to the cutter 11 and the bed 8, carrying the work along with it to affect a transverse cut; and after each transverse cut, the section 13 is moved back to the starting point and the work is advanced longitudinally by moving the section 16 of the table 12 in an obvious manner a distance equal to the width of one cut. These cutting steps are, of course, repeated until the complete pattern has been cut; and since the template 35 is movable only transversely of the work along with the table section 13, the follower guide-style constantly remains in vertical alinement therewith and coacts with the contour-forming edge thereof throughout each cut. Likewise, since the template 43 is movable with the template 35, supporting block 38 and guide-style 42 in a direction transversely of the work along with the table section 13 and is movable with respect to the template 35, block 38 and guide-style 42 only longitudinally of the work 22 along with the table section 16, the guide-style 42 constantly remains in vertical alinement with the template 43 and coacts with the contour-forming edge thereof throughout each cut; and the cutter 11 is thus effectively guided at all times to form the desired pattern in the work 22.

From the foregoing detailed description, it is believed apparent that my present invention provides an improved cutter guide attachment for milling machines which is simple in construction and which is highly efficient and positive in actual operation. The improved attachment may be used in place of the usual complete pattern at considerable savings, and may be used with relatively inexpensive templates 35 and 43 of a variety of different contours which may be readily interchanged in a few simple operations with the aid of standard tools. Furthermore, the improved attachment results in extremely accurate work, and effects great savings, not only in time and expense, but also in relatively scarce materials which were heretofore believed necessary in hand-forming the complete pattern in each case. The templates may be formed of any suitable and readily available sheet material and may be adjustably secured to their respective supporting members in any suitable manner other than by means of the plates or bars 36, 45; and the end posts 39 for supporting the block 38 for vertical movement may, of course, likewise assume different forms and may either be secured to the block 38 and rendered slidable in suitable bores formed in the arms 40 or they may be secured to the arms 40 and slidably coact with the block 38 through suitable bores or the like. As shown in Figs. 1 and 2, the work 22 may be clamped in diverse manners in different types of fixtures, and also various types of cutting tools may be used. Obviously, all parts of the attachment are accessible for quick and easy replacement or repair; and although the improved unit has been shown and described as applied to and utilized with a vertical milling machine and a hydraulic pattern follower of particular types, the improvement may obviously be advantageously used with other forms of vertical milling machines, and with other types of cutting or forming machines embodying a vertical and longitudinal feed and a movable cutter, and with hydraulic or manual pattern followers with equal success. The improved attachment has proven highly successful, entirely practical and extremely accurate in actual commercial use under diverse conditions.

It should be understood that it is not desired or intended to limit this invention to the exact details of construction or to the precise mode of operation herein shown and described, for various modifications within the scope of the claims may occur to persons skilled in the art to which this invention pertains.

I claim:

1. In a forming machine; a work holder comprising, a first support mounted for reciprocation in one path, and a second support mounted for movement transversely to said first support; a machine tool and means for controlling vertical movement of said machine tool comprising, a first dimension contour mounted for movement with one of said supports and for vertical movement with respect thereto, a first contour follower coacting with said first dimension contour to trace one dimension, a second dimension contour carried by the other support and movable with both of said supports and transversely movable with respect to said first contour, a second contour follower coacting with said second dimension contour for tracing a dimension transverse to said first dimension and transmitting vertical movement to said first contour whereby said first contour follower is responsive to both of said contours, and means for controlling said machine tool by said first contour follower.

2. A forming machine as set forth in claim 1 characterized thereby in that the second contour follower is carried by and depends from the first dimension contour.

3. A forming machine as set forth in claim 1 characterized thereby in that the movement of the first and second supports is solely in a horizontal plane and the first and second dimension contours are in the form of elongated plates.

4. A forming machine as set forth in claim 1 characterized thereby in that the first and second dimension contours are detachably mounted on independent supporting members.

5. A forming machine as set forth in claim 1 characterized thereby in that the first dimension contour has an upper edge conforming to the desired transverse contour of the work and the second dimension contour has an upper edge conforming to the desired longitudinal contour of the work with which the respective followers are adapted to coact.

6. A forming machine as set forth in claim 1 characterized thereby in that the first dimension contour is carried for its vertical movement by a pair of upright members loosely associated with one of the supports.

LEONARD J. SIEPE.

REFERENCES CITED

The following references are of record in the file of this patent:

UNITED STATES PATENTS

| Number | Name | Date |
|---|---|---|
| 2,332,532 | Roehm | Oct. 26, 1943 |
| 2,389,653 | Turchan | Nov. 27, 1945 |
| 2,412,549 | Yates | Dec. 10, 1946 |
| 2,471,097 | Dall | May 24, 1949 |

FOREIGN PATENTS

| Number | Country | Date |
|---|---|---|
| 478,148 | Germany | June 18, 1929 |